(12) United States Patent
Augusto Lizarraga et al.

(10) Patent No.: US 10,935,000 B2
(45) Date of Patent: Mar. 2, 2021

(54) TOOL FOR TRANSPORTING A WIND TURBINE POWER TRAIN SUBSET

(71) Applicant: NORDEX ENERGY SPAIN, S.A.U., Barasoain (ES)

(72) Inventors: Nuria Augusto Lizarraga, Barasoain (ES); Andres Valle Martin, Madrid (ES); Diego Rueda Alzugaray, Madrid (ES); Unai Arraztoa Magana, Barasoain (ES); Juan Irurita Loyarte, Barasoain (ES); Ander Gaston Lujambo, Barasoain (ES); Teresa Arlaban Gabeiras, Barasoain (ES); Jose Miguel Garcia Sayes, Barasoain (ES); Miguel Nunez Polo, Barasoain (ES)

(73) Assignee: NORDEX ENERGY SPAIN, S.A.U., Barasoain (ES)

( * ) Notice: Subject to any disclaimer, the term of this patent is extended or adjusted under 35 U.S.C. 154(b) by 0 days.

(21) Appl. No.: 16/223,851

(22) Filed: Dec. 18, 2018

(65) Prior Publication Data
US 2019/0186466 A1   Jun. 20, 2019

(30) Foreign Application Priority Data
Dec. 18, 2017   (ES) ............................. ES201731530U

(51) Int. Cl.
*F03D 13/40*   (2016.01)
*F16M 11/22*   (2006.01)
(Continued)

(52) U.S. Cl.
CPC ............. *F03D 13/40* (2016.05); *F16M 11/22* (2013.01); *F01D 25/28* (2013.01);
(Continued)

(58) Field of Classification Search
CPC .......... F03D 13/40; F16M 11/22; F16M 7/00; F05B 2240/50; F05B 2240/60;
(Continued)

(56) References Cited

U.S. PATENT DOCUMENTS

| 4,804,162 A | * | 2/1989 | Rice | ..................... B25H 1/0007 248/129 |
| 6,793,458 B2 | * | 9/2004 | Kawai | ..................... F01D 25/28 248/671 |

(Continued)

*Primary Examiner* — Tan Le
(74) *Attorney, Agent, or Firm* — Hayes Soloway P.C.

(57) ABSTRACT

The tool includes a first support element with: a first resting surface for allowing the tool to rest on the floor; a first support surface and a second support surface for respectively supporting on the same a first arm and a second arm of a first support of the subset that supports a low-speed shaft. Between the first support surface and the first resting surface is a first distance that is different from a second distance between the second support surface and the first resting surface. The difference in distances allows the low-speed shaft to be transported in a container according to an inclined orientation, with the maximum dimension thereof oriented according to the diagonal of the container, thereby simplifying the transport costs and logistics.

21 Claims, 7 Drawing Sheets

(51) Int. Cl.
 *F16M 7/00* (2006.01)
 *F01D 25/28* (2006.01)
(52) U.S. Cl.
 CPC ....... *F05B 2240/50* (2013.01); *F05B 2240/60* (2013.01); *F05B 2260/02* (2013.01); *F16M 7/00* (2013.01); *Y02E 10/72* (2013.01)
(58) Field of Classification Search
 CPC ........ F05B 2260/02; Y02E 10/72; B60P 7/06; F01D 25/28
 See application file for complete search history.

(56) References Cited

U.S. PATENT DOCUMENTS

| | | | | |
|---|---|---|---|---|
| 7,726,182 B1* | 6/2010 | Newlin | ................. | G01M 15/02 73/116.01 |
| 8,876,448 B1* | 11/2014 | Hess | ......................... | B60P 7/06 410/46 |
| 9,211,925 B2* | 12/2015 | Jang | ..................... | B62D 65/026 |
| 9,752,505 B2* | 9/2017 | Roh | ......................... | F01D 25/28 |
| 2012/0146274 A1* | 6/2012 | Kim | ..................... | B62D 65/026 269/61 |

* cited by examiner

STATE OF THE ART

TOOL FOR TRANSPORTING A WIND TURBINE POWER TRAIN SUBSET

CROSS-REFERENCE TO RELATED APPLICATIONS AND PRIORITY

This patent application claims priority from ES Patent Application No. U201731530 filed Dec. 18, 2017, which is herein incorporated by reference in its entirety.

DESCRIPTION

Object of the Invention

The present invention can be included in the transport sector. Likewise, the present invention can be included in the field of renewable energy, in particular wind energy. More specifically, the object of the invention relates to a tool that is especially designed for transporting a wind turbine power train subset, in particular for transporting what is called the low-speed shaft, along with the low-speed shaft bearings and the bearing supports.

Background of the Invention

Currently, in the wind energy sector there is a trend of designing and manufacturing wind turbine rotors of greater size and power, which in turn increases the size and weight of the other components of the wind turbine. As a result, transport becomes more complex and costs go up, and therefore devices must be provided to transport some of said components separately.

The power train is an assembly of the heaviest subsystem of the nacelle of a wind turbine, given that it includes the following elements: the low-speed shaft (LSS), low-speed shaft bearings (not shown), bearing supports and in certain cases a gearbox is included.

FIG. 1, representing the state of the art, shows the low-speed shaft (1), which is a monolithic rotating piece in the form of a trumpet, and which has sections with decreasing cross sections and sections with uniform cross sections that are generally, but not necessarily, alternating. Low-speed bearings (not shown) are respectively mounted on two of said cross sections of different dimensions, which comprise a first bearing and a second bearing, the first bearing being supported on a cross section closer to a first end, with a greater cross section, of the low-speed shaft (1). Additionally, each bearing is supported on the low-speed shaft (1) by a corresponding support (2, 3), in other words, by a first support (2) and a second support (3), respectively, wherein each support (2, 3), when mounted on the low-speed shaft (1), has a longitudinal direction that is perpendicular to the axis of revolution of the low-speed shaft (1). In general, the two supports (2, 3) have the same size and therefore have the same length throughout the longitudinal direction thereof, but they could also have different sizes.

To transport the low-speed shaft (1) with the bearings and the bearing supports (2, 3) mounted, tools that incorporate two pairs of supports (4) are used, one pair for each support (2, 3), situated at the same height, wherein each support (4) supports one end, according to the longitudinal direction, of the corresponding support (2, 3) thereof.

Thus, to transport the power train (low-speed shaft (1), bearings and bearing supports (2, 3)), what has been done up to the present is to position the low-speed bearing (1) with the two bearing supports (2, 3) parallel to the floor, such that the supports (2, 3) are in a horizontal position, as shown in FIG. 1. However, the arrangement described makes it so the overall width of the power train, meaning from end to end of the bearing support (2, 3) with the greatest diameter, is greater than the inner dimension of the width of a standard container intended to transport the power train by means of ships, implying the need to use a specific type of container without side walls, which has a much higher cost than standard containers. For that reason, this new tool has been designed, which allows the power train to be transported in standard containers, thereby reducing costs.

DESCRIPTION OF THE INVENTION

The present invention describes a tool for transporting a wind turbine power train subset, wherein the power train subset comprises: a shaft called "low-speed shaft", at least a first bearing, mounted on the low-speed shaft, and at least a first support for supporting the first bearing on said low-speed shaft, said first support being provided with a first arm and a second arm.

The tool of the invention comprises a first support element, which comprises a first resting surface for allowing the first support element to rest on the floor, and at least a first and second support surface, configured to support each one of the respective first arm and second arm of the first support.

Likewise, there is a first distance between the first support surface and the first resting surface, as well as a second distance between the second support surface and said first resting surface, wherein the first distance is different from the second distance.

According to a preferred embodiment, the power train subset additionally comprises a second bearing, mounted on the low-speed shaft, and a second support, for fastening the second bearing to the low-speed shaft, wherein the second support is provided with a third arm and a fourth arm, thus the tool additionally comprises a second support element which, in turn, comprises:

a second resting surface, to allow the tool to rest on the floor, and a third support surface and a fourth support surface, configured to support the respective third arm and fourth arm on the same, wherein there is a third distance between the third support surface and the second resting surface, said third distance being different from a fourth distance between the fourth support surface and said second resting surface.

Likewise, and also according to a preferred embodiment, the tool further comprises an additional support element which, in turn, comprises:

an additional resting surface, and on said additional resting surface, an additional support body provided with at least one additional support surface on the upper part for supporting one end of the low-speed shaft.

DESCRIPTION OF THE DRAWINGS

As a complement to the description provided herein and for the purpose of helping to make the characteristics of the invention more readily understandable, in accordance with a preferred practical embodiment thereof, said description is accompanied by a set of drawings constituting an integral part of the same, which by way of illustration and not limitation represent the following:

FIG. 6A shows a perspective view of the tool according to the invention, wherein the distances between the support surfaces and the resting surfaces are shown. FIG. 6B shows a side view of the subset of the low-speed shaft, mounted on the tool of the invention, wherein the actual maximum width and the maximum transport width are shown.

PREFERRED EMBODIMENT OF THE INVENTION

Figure 1:
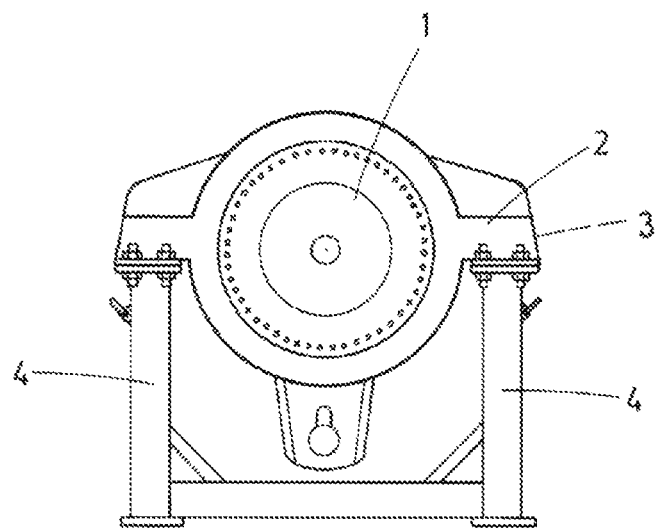
FIG. 1 shows a tool for transporting a wind turbine power train subset, including the low-speed shaft with the corresponding bearings and bearing supports, according to the state of the art.
Figure 2:
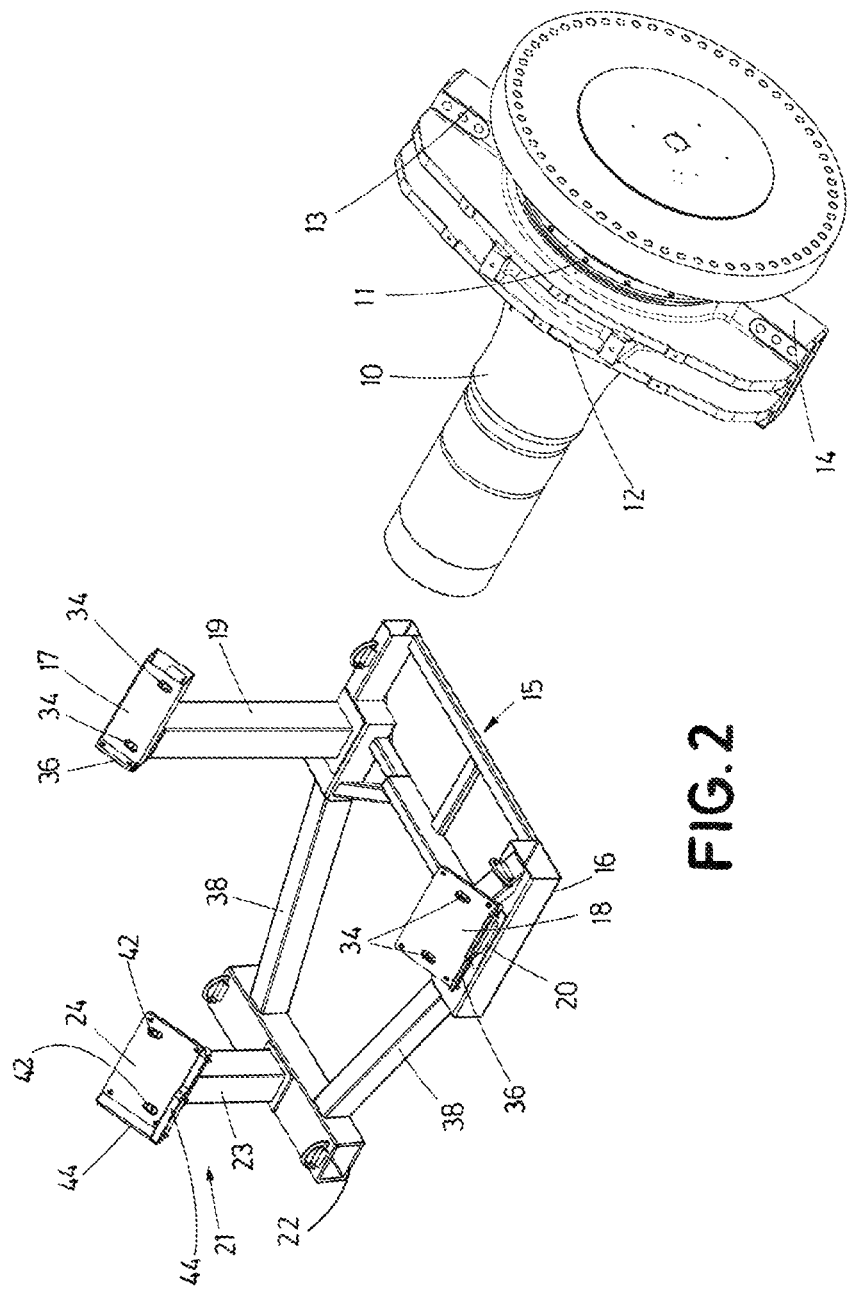
FIG. 2 shows a perspective view of a tool for transporting a wind turbine power train subset, according to a first particular embodiment of the present invention, wherein a first support element and an additional second support element can be seen along with the subset, which includes the low-speed shaft, a first bearing and a first support.
Figure 3:
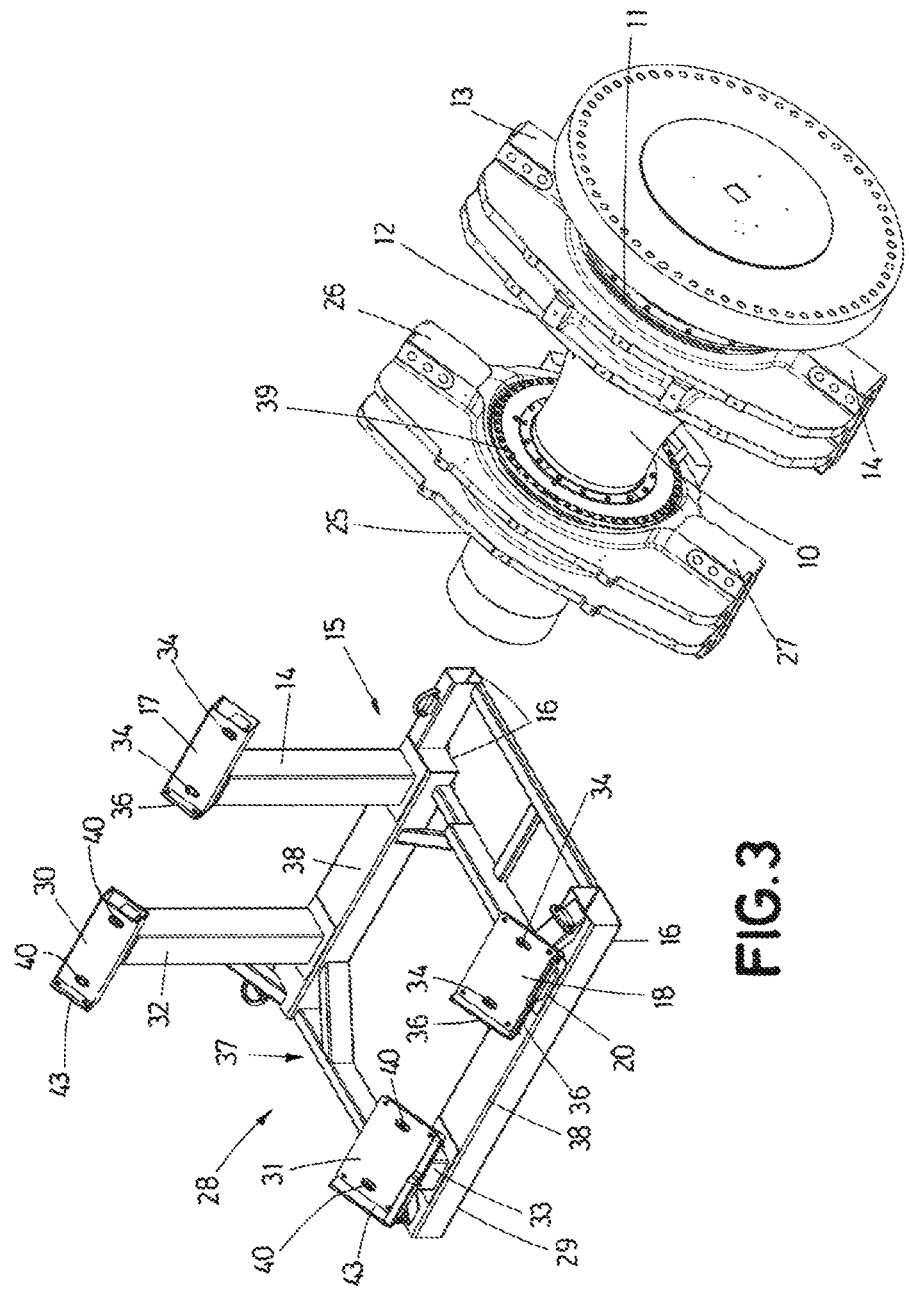
FIG. 3 shows a perspective view of a tool for transporting a wind turbine power train subset, according to a second particular embodiment of the present invention, wherein a first support element and a second support element, the subset, which includes the low-speed shaft, first and second bearings and first and second supports can be seen.

Subsequently, with the help of the aforementioned attached FIGS. 1-6B, a detailed description is provided of a preferred embodiment of a tool for transporting a wind turbine power train subset, object of the present invention.

The tool of the invention is intended as a tool for transporting a wind turbine power train subset. In particular, the tool is intended to transport a power train subset formed at least by the following elements: a shaft, called low-speed shaft (10), along with at least a first bearing (11) mounted on the low-speed shaft (10), and a first support (12) intended to support the first bearing (11) and the low-speed shaft (10) on a frame (not shown) of the wind turbine, and wherein the first support (12) comprises a first arm (13) and a second arm (14).

To this end, the tool comprises a first support element (15) which, in turn, incorporates a first resting surface (16) to allow the first support element (15) to rest on a floor. The first support element (15) further comprises a first support surface (17) and a second support surface (18) so that the first arm (13) and the second arm (14), respectively, can rest on the same.

Between the first support surface (17) and the first resting surface (16) is a first distance (D1), and between the second support surface (18) and said first resting surface (16) is a second distance (D2), wherein the first distance D1 and the second distance D2 are different. To define the first distance (D1) and the second distance (D2), homologous reference points are preferably taken on the first support surface (17) and on the second support surface (18), especially when said first (17) and second (18) support surfaces are not horizontal. For example, the lowest points of each one of them may be taken as a reference, as seen in the figures.

Figure 6A:
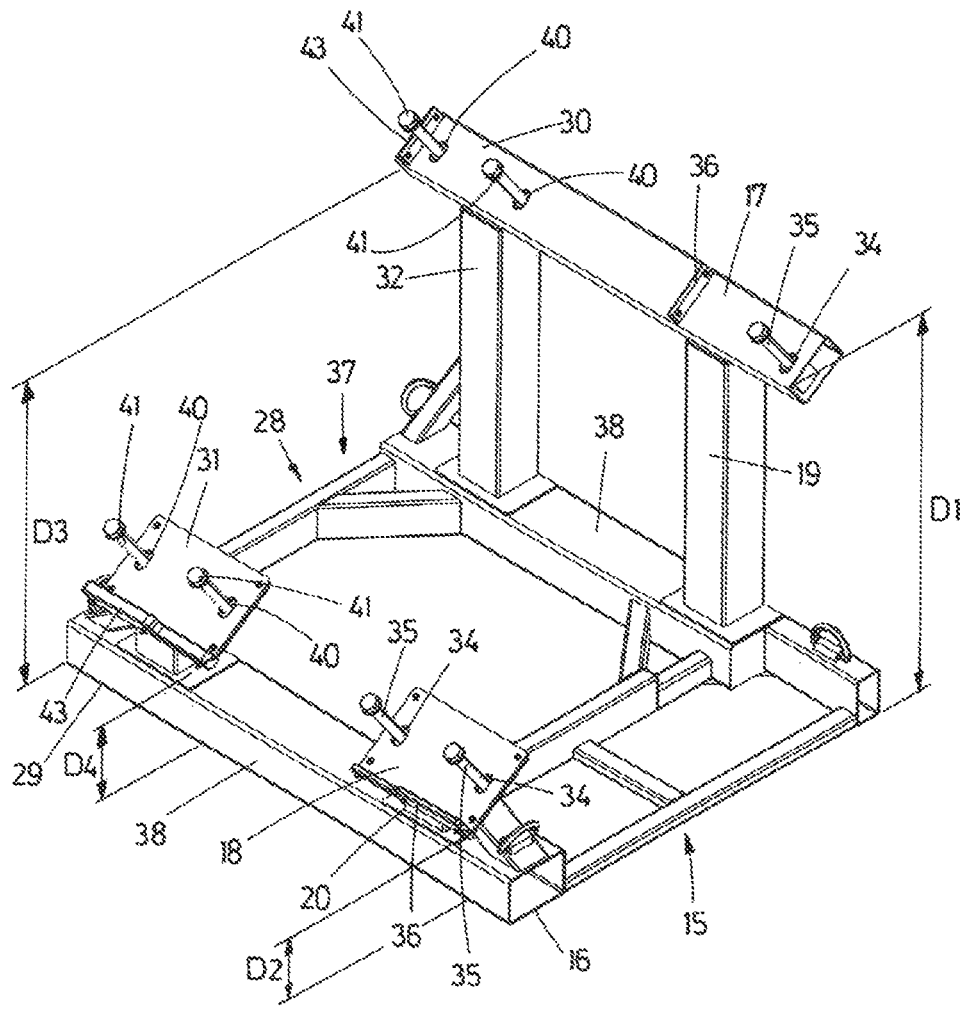
FIGS. 6A and 6B.
Figure 6B:
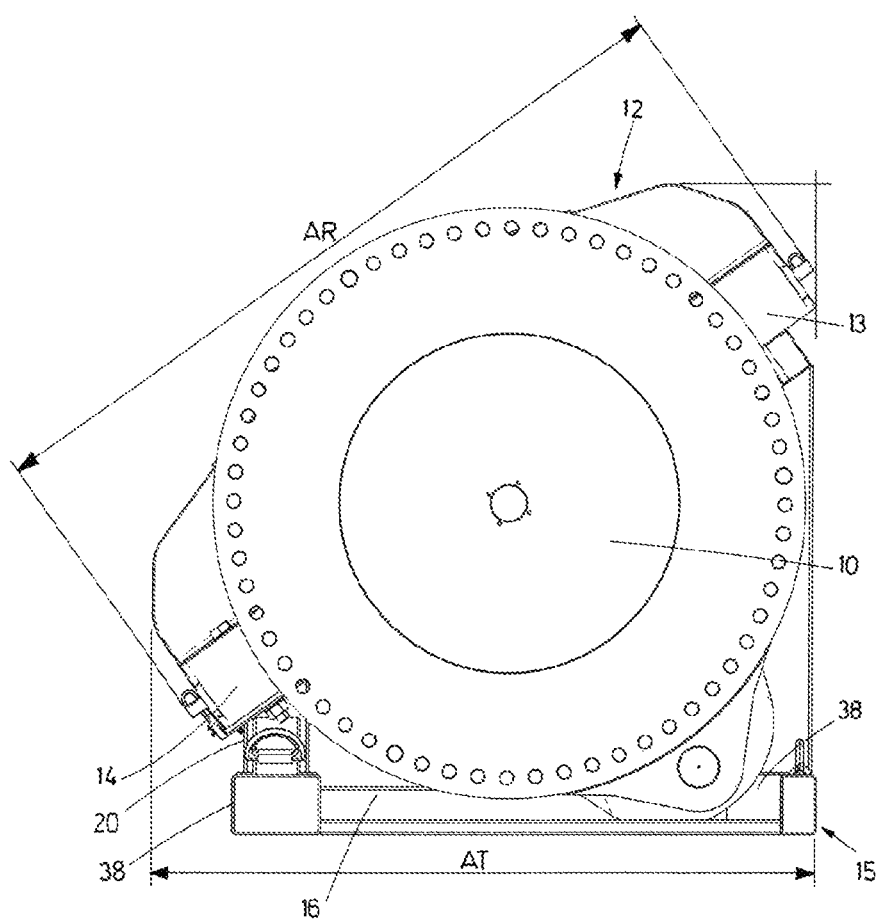

In FIG. 6B one can see how the power train subset has an actual maximum width (AR), as well as a maximum transport width (AT), which corresponds to a projection of the actual maximum width (AR) on a horizontal plane. The previously described invention allows the power train subset to incline, from which the maximum transport width (AT) is smaller than the actual maximum width (AR). As a result, in an embodiment, it allows for the tool of the invention, along with the power train subset, to be introduced in a conventional transport container (not shown).

Preferably, the first support element (15) incorporates, on the first resting surface (16), a first support body (19) and a second support body (20), one on each right and left side of said first resting surface (16), the first support surface (17) situated on the first support body (19) and the second support surface (18) situated on the second support body (20).

In this case, to help stabilise the power train on the first support element (15), the tool additionally comprises an additional support element (21) which, in turn, comprises an additional resting surface (22), and on said additional resting surface (22) an additional support body (23), provided with at least an additional support surface (24) on the upper part thereof for supporting one end of the low-speed shaft (10) longitudinally opposite the first support element (15).

In another embodiment, the power train subset can additionally incorporate a second bearing (39) mounted on the low-speed shaft (10), as well as a second support (25) to fasten the second bearing (39) to the low-speed shaft (10), and which, in turn, is provided with a third arm (26) and a fourth arm (27). The tool additionally comprises a second support element (28) which, in turn, comprises a second resting surface (29) to allow the second support element (28) to rest on a floor in a stable way. The second support element (28) further comprises a third support surface (30) and a fourth support surface (31) so that the third arm (26) and the fourth arm (27) of the second support (25) can rest on the same.

Between the third support surface (30) and the second resting surface (29) is a third distance D3, and between the fourth support surface (31) and said second resting surface (29) is a fourth distance D4, wherein the third distance D3 and the fourth distance D4 are different. Preferably, the third distance (D3) and the fourth distance (D4) are respectively equal to the first distance (D1) and the second distance (D2). In a similar way to what was previously mentioned for the case of the first distance (D1) and the second distance (D2), it holds that the homologous reference points are preferably taken on the third support surface (30) and the fourth support surface (31), especially when said third (30) and fourth (31) support surfaces are not horizontal. For example, the lowest points of each one of them may be taken as a reference, as seen in the figures.

On the other hand, the second support element (28) preferably comprises, on the second resting surface (29), a third support body (32) and a fourth support body (33), one on each right and left side of said second resting surface (29), wherein the third support surface (30) is situated on the third support body (32) and the fourth support surface (31) is situated on the fourth support body (33).

The tool preferably comprises a longitudinal direction of the tool, the first support body (19) and the second support body (20) being located on the same first section along the longitudinal direction of the tool. Likewise, the third support body (32) and the fourth support body (33) are preferably located on the same second section along the longitudinal direction of the tool.

Preferably, any one, several, or all of the first (17), second (18), third (30) and fourth (31) support surfaces are inclined with respect to a horizontal plane.

Likewise, also preferably, the support bodies (19, 20, 23, 32, 33) can comprise vertical beams. In particular, the first (19) and/or second (20) support bodies can comprise first beams, while the third (32) and fourth (33) support bodies can comprise second beams and the additional support body (23) can comprise a third beam.

On the other hand, also preferably, any one, several, or all of the first (17), second (18), third (30) and fourth (31) support surfaces have a greater area than the surface of the corresponding arm (13, 14, 26, 27) that rests on the same.

Likewise, on the other hand, the first (17), second (18), third (30), fourth (31) and additional (24) support surfaces comprise fastening means to be fastened in a separable way to the corresponding arms (13, 14, 26, 27). In particular, the first (17) and/or second (18) support surfaces can comprise first fastening means, while the third (30) and/or fourth (31) support surfaces can comprise second fastening means; and the additional support surface (24) can comprise third fastening means. The fastening means preferably comprise holes (34, 40, 42) made on the first (17), second (18), third (30), fourth (31) and additional (24) support surfaces; as well as bolts (35, 41) for cooperating with the holes (34, 40). In particular, the first fastening means comprise first bolts (35) and first holes (34), while the second fastening means comprise second bolts (41) and second holes (40), and the third fastening means comprise third bolts (not shown) and third holes (42). The holes (34, 40, 42) are preferably perpendicular to the corresponding first (17), second (18), third (30), fourth (31) and additional (24) surfaces thereof. As an alternative to the holes (34, 40, 42) and the bolts (35, 41), the fastening means can preferably comprise clamps. Instead of having third fastening means, the end of the low-speed shaft (10) could simply rest on the additional support surface (24).

In relation to the preceding paragraph, the fastening means, in particular the holes (34, 40) can be used as reference points for measuring the heights (D1, D2, D3, D4).

Preferably, the first (17), second (18), third (30), fourth (31) and additional (24) support surfaces comprise positioning elements (36, 43, 44) for longitudinally and/or transversally positioning the corresponding arms (13, 14, 26, 27) and, if applicable, the corresponding end of the low-speed shaft (10). The positioning elements (36, 43, 44) comprise: first positioning elements (36) for the first (17) and second (18) support surfaces, second positioning elements (43) for the third (30) and fourth (31) support surfaces; and third positioning elements (44) for the additional support surface (24). The positioning elements (36, 43, 44) are preferably located on a lower area, and/or on a side area of the first (17), second (18), third (30), fourth (31) and additional (24) support surfaces. The positioning elements (36, 43, 44) act as stops that limit the movement of the arms (13, 14, 26, 27) and of the low-speed shaft (10), if necessary.

Figure 4:
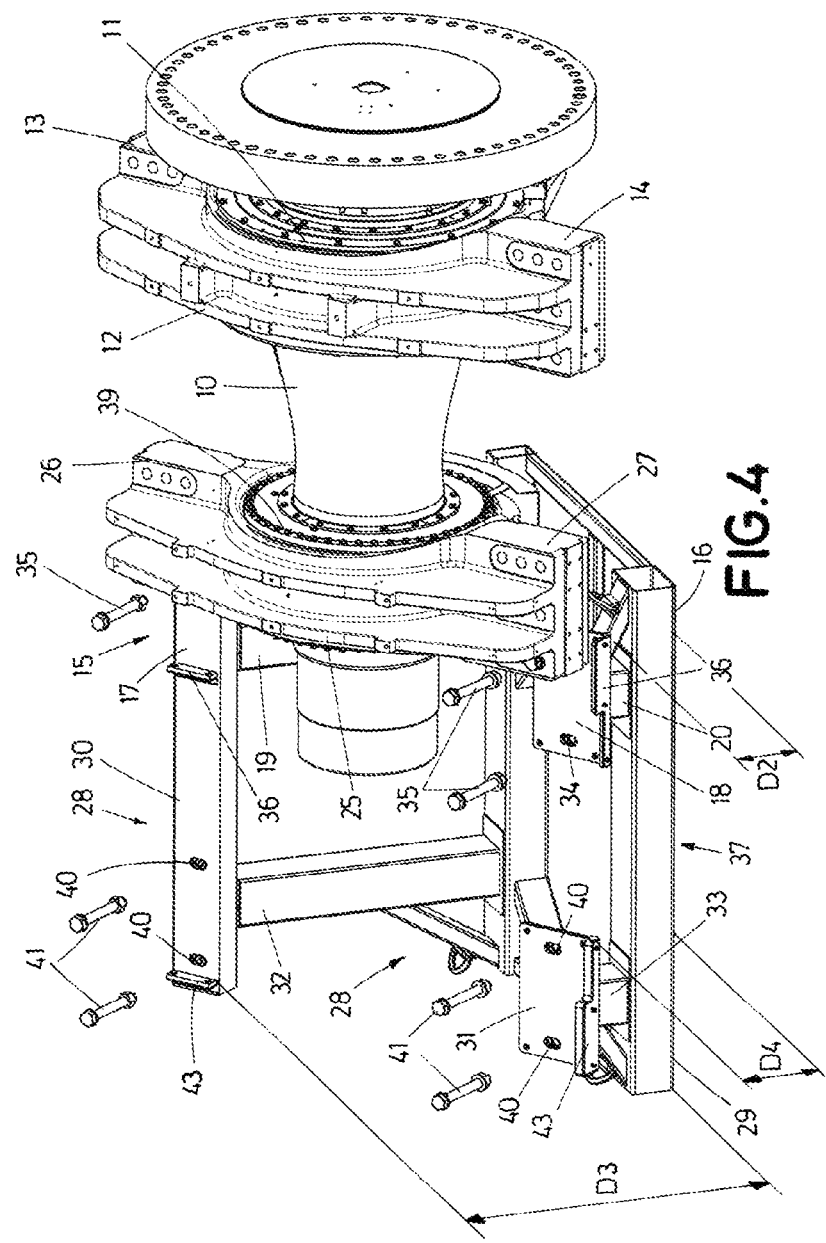
FIG. 4 shows a perspective view of a tool for transporting a wind turbine power train subset, according to a third particular embodiment of the present invention, wherein a first support element and a second support element connected to each other can be seen along with the subset, which includes a low-speed shaft, first and second bearings and first and second supports about to be mounted in the tool.
Figure 5:
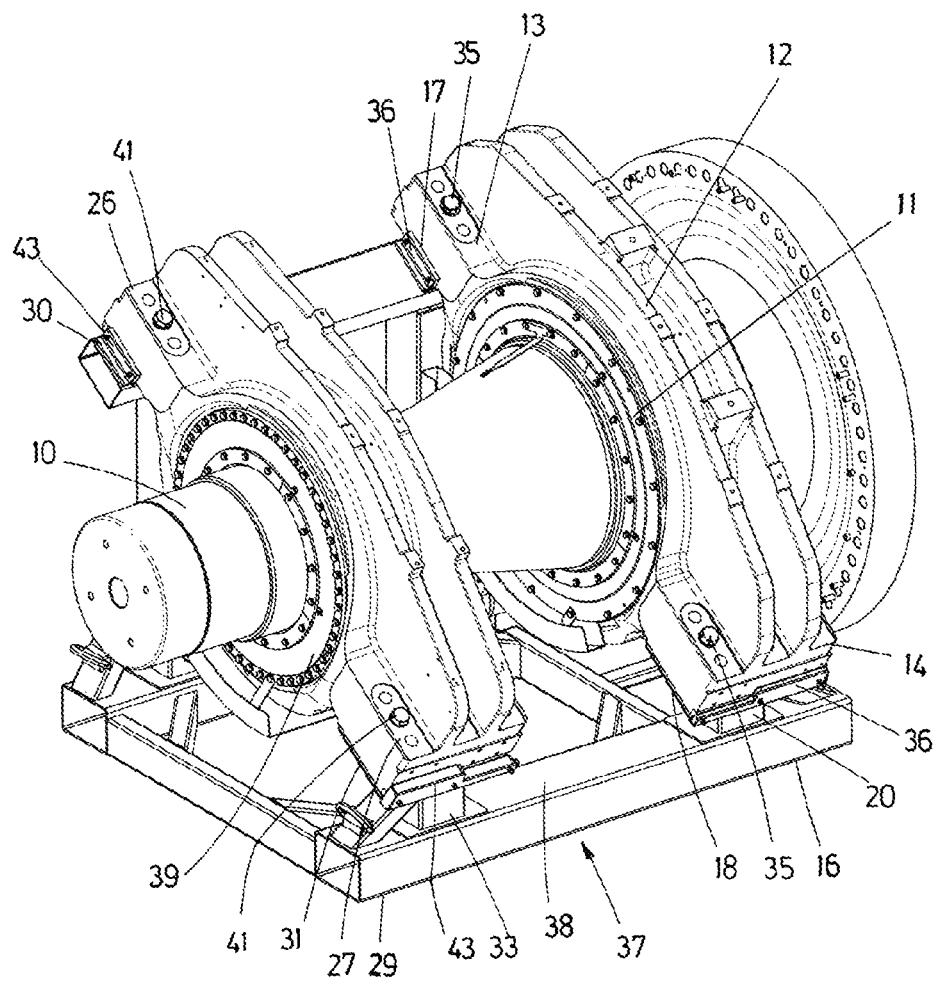
FIG. 5 shows the tool object of the invention with the set loaded.

According to a preferred embodiment, as shown in FIGS. 4 and 5, the first (17) and third (30) support surfaces can form part of a single body, for example a beam. Optionally, although in the figures the second (18) and fourth (31) support surfaces are shown as separated bodies, they can likewise form part of a single body, a beam for example.

Preferably, the first support element (15) and the second support element (28), and optionally, if necessary, the first support element (15) and the additional support element (21), are connected to each other. According to a first example, the tool incorporates a base (37), which the first resting surface (16) and/or the second resting surface (29) and/or the additional resting surface (22) form part of, or are connected to, wherein the first support element (15) and/or the additional support element (21) or the first support element (15) and/or the second support element (28) are able to be coupled or are coupled to said base (37).

Alternatively, according to a second example, the first support element (15) and the second support element (28), as well as the first support element (15) and the additional support element (21) are able to be coupled or are coupled by means of connection elements (38), such as plates, bars, frames, etc.

On the other hand, the power train subset can additionally comprise a gearbox (not shown), coupled to the low-speed shaft (10) and which comprises at least a lateral support element, which additionally comprises:
third support means, which, in turn, comprise at least a third support body, and
a third support surface, on each third support body, to support the lateral support element or elements of the gearbox.

The invention claimed is:
1. A tool for transporting a wind turbine power train subset, the power train subset having:
a low-speed shaft,
at least one first bearing, mounted on the low-speed shaft, and
at least one first support for supporting the at least one first bearing on the low-speed shaft, the at least one first support being provided with a first arm and a second arm,
wherein the tool comprises a first support element, which, in turn, comprises:
a first resting surface to allow the tool to rest on the floor, and
a first support surface and a second support surface, configured to respectively support the first arm and the second arm of the wind turbine power train subset,
wherein there is a first distance between the first support surface and the first resting surface,
wherein the first distance is different from a second distance existing between the second support surface and the first resting surface;
wherein the first resting surface comprises a right side and a left side, wherein the first support element comprises, on the first resting surface, a first support body and a second support body, one on each right and left side of the first resting surface, wherein the first support surface is situated on the first support body and the second support surface is situated on the second support body; and
wherein the tool comprises a longitudinal direction of the tool, wherein the first support body and the second support body are located in one same first cross section with respect to the longitudinal direction of the tool.

2. The tool of claim 1, wherein any one, several, or all of the first and second support surfaces are inclined with respect to a horizontal plane.

3. The tool of claim 1, wherein any one, several or all of the first and second support surfaces comprise first fastening means to be fastened in a separable way to the first arm and the second arm of the wind turbine power train subset.

4. The tool of claim 3, wherein the first fastening means comprise:
  first holes made in the first and second support surfaces; and
  first bolts for cooperating with the first holes.

5. The tool of claim 1, wherein the first and/or second support surfaces comprise first positioning elements for longitudinally and/or transversally positioning the first arm and the second arm of the wind turbine power train subset.

6. The tool of claim 1, which additionally comprises an additional support element which, in turn comprises:
  an additional resting surface, and
  on the additional resting surface, an additional support body provided with at least one additional support surface on the upper part for supporting one end of the low-speed shaft.

7. The tool of claim 1, wherein the power train subset additionally has a second bearing, mounted on the low-speed shaft, and a second support, for fastening the second bearing to the low-speed shaft, and which is provided with a third arm and a fourth arm, wherein the tool additionally comprises a second support element which, in turn, comprises:
  a second resting surface, to allow the tool to rest on the floor, and
  a third support surface and a fourth support surface, configured to support the respective third arm and the fourth arm of the wind turbine power train subset on the third support surface and fourth support surface,
wherein there is a third distance between the third support surface and the second resting surface, the third distance being different from a fourth distance between the fourth support surface and the second resting surface.

8. The tool of claim 7, wherein the second support element comprises, on the second resting surface, a third support body and a fourth support body, one on each right and left side of the second resting surface, wherein the third support surface is situated on the third support body and the fourth support surface is situated on the fourth support body.

9. The tool of claim 8, wherein the tool comprises a longitudinal direction of the tool, wherein the third support body and the fourth support body are located in one same second cross section along the longitudinal direction of the tool.

10. The tool of claim 7, wherein any one, several or all of the third and fourth support surfaces are inclined with respect to a horizontal plane.

11. The tool of claim 7, wherein the third and fourth support surfaces comprise second fastening means to be fastened in a separable way to the third arm and the fourth arm of the wind turbine power train subset.

12. The tool of claim 11, wherein the second fastening means comprise:
  second holes made in the third and fourth support surfaces; and
  second bolts for cooperating with the second holes.

13. The tool of claim 12, wherein the second holes are perpendicular to the third and fourth support surfaces.

14. The tool of claim 7, wherein the third and fourth support surfaces comprise second positioning elements for longitudinally and/or transversally positioning the third arm and the fourth arm of the wind turbine power train subset.

15. The tool of claim 14, wherein the second positioning elements are located in a lower area and/or in a side area of the third and/or fourth support surfaces.

16. The tool of claim 8, wherein the third and fourth support bodies comprise second vertical beams.

17. The tool of claim 7, wherein the third distance is substantially equal to the first distance and/or the fourth distance is substantially equal to the second distance.

18. The tool of claim 7, which additionally comprises an additional support element which, in turn comprises:
  an additional resting surface, and
  on the additional resting surface, an additional support body provided with at least one additional support surface on the upper part for supporting one end of the low-speed shaft,
the tool further comprising a base which, in turn, comprises the first resting surface and the second resting surface, or the first resting surface and the additional resting surface, the first support element, the second support element and the additional support element respectively being able to be coupled to the base.

19. The tool of claim 1, wherein the first support surface and the second support surface are located in one same first cross section with respect to the longitudinal direction of the tool.

20. The tool of claim 1, wherein the first distance is defined as a distance between a lowest point of the first support surface and the first resting surface, and the second distance is defined as a distance between a lowest point of the second support surface and the first resting surface.

21. A tool for transporting a wind turbine power train subset, the power train subset having:
  a low-speed shaft,
  at least one first bearing, mounted on the low-speed shaft, and
  at least one first support for supporting the at least one first bearing on the low-speed shaft, the at least one first support being provided with a first arm and a second arm,
wherein the tool comprises a first support element, which, in turn, comprises:
  a first resting surface to allow the tool to rest on the floor, and
  a first support surface and a second support surface, configured to respectively support the first arm and the second arm of the wind turbine power train subset,
wherein there is a first distance between the first support surface and the first resting surface,
wherein the first distance is different from a second distance existing between the second support surface and the first resting surface;
wherein the power train subset additionally has a second bearing, mounted on the low-speed shaft, and a second support, for fastening the second bearing to the low-speed shaft, and which is provided with a third arm and a fourth arm, wherein the tool additionally comprises a second support element which, in turn, comprises:
  a second resting surface, to allow the tool to rest on the floor, and
  a third support surface and a fourth support surface, configured to support the respective third arm and the fourth arm of the wind turbine power train subset on the third support surface and fourth support surface,
wherein there is a third distance between the third support surface and the second resting surface, the third distance being different from a fourth distance between the fourth support surface and the second resting surface, wherein the second support element comprises, on the second resting surface, a third support body and a fourth support body, one on each right and left side of the second resting surface, wherein the third support surface is situated on the third support body and the fourth support surface is situated on the fourth support body, wherein the tool comprises a longitudinal direction of the tool, wherein the third support body and the fourth support body are located in one same second cross section along the longitudinal direction of the tool.

\* \* \* \* \*